United States Patent [19]

Ruhl

[11] Patent Number: 4,722,501

[45] Date of Patent: Feb. 2, 1988

[54] BOW HANGER

[75] Inventor: David C. Ruhl, Wye Mills, Md.

[73] Assignee: R & L Products, Wye Mills, Md.

[21] Appl. No.: 927,188

[22] Filed: Nov. 5, 1986

[51] Int. Cl.⁴ .............................................. E04G 5/06
[52] U.S. Cl. ................................ 248/218.4; 248/231; 248/304
[58] Field of Search ................. 248/218.4, 219.3, 231, 248/304, 303, 309.1; 24/71.1, 71.2, 68 CD; 182/90-92, 187; 124/23 R

[56]  References Cited

U.S. PATENT DOCUMENTS

| 939,318 | 11/1909 | Redman | 248/304 |
|---|---|---|---|
| 1,628,623 | 5/1927 | Jonnes | 248/231 |
| 3,022,898 | 2/1962 | Loeb | 248/231 |
| 3,136,519 | 6/1964 | Spriggle | 248/231 |
| 3,232,664 | 2/1966 | McBride | 248/231 |
| 3,897,926 | 8/1975 | Silver | 248/916 |
| 4,008,871 | 2/1977 | Rex | 248/304 |
| 4,098,483 | 7/1978 | Pesola | 248/304 |
| 4,185,360 | 1/1980 | Prete, Jr. | 24/68 CD |
| 4,199,182 | 4/1980 | Sunesson | 24/68 CD |
| 4,409,907 | 10/1983 | Norton | 248/231 |
| 4,510,651 | 4/1985 | Prete, Jr. | 24/68 CD |
| 4,542,873 | 9/1985 | Matherly . | |

FOREIGN PATENT DOCUMENTS 313127  3/1956  Switzerland .......................... 182/92

Primary Examiner—J. Franklin Foss
Assistant Examiner—Robert A. Olson
Attorney, Agent, or Firm—Brady, O'Boyle & Gates

[57] ABSTRACT

A bow hanger which may be readily installed on a tree or other generally vertical standard is comprised of a relatively small diameter steel rod which is bent at a substantially right angle at the rear end which fits into and is retained by a clevis included on a ratchet type of tightening device for a strap adapted to encircle and be tightened about the tree. The forward end of the rod includes an upwardly angulated tip for retaining the bow in a relatively fixed position. The tip as well as an adjacent portion of the rod is covered by a resilient tubing member. A push nut is fitted on the rear end of the rod to hold the rod in place on strap tightening device. An angularly offset end portion is included at the rear end for contacting the tree and operates to maintain the forward end of the rod in a generally horizontal position.

8 Claims, 4 Drawing Figures

U.S. Patent  Feb. 2, 1988  4,722,501
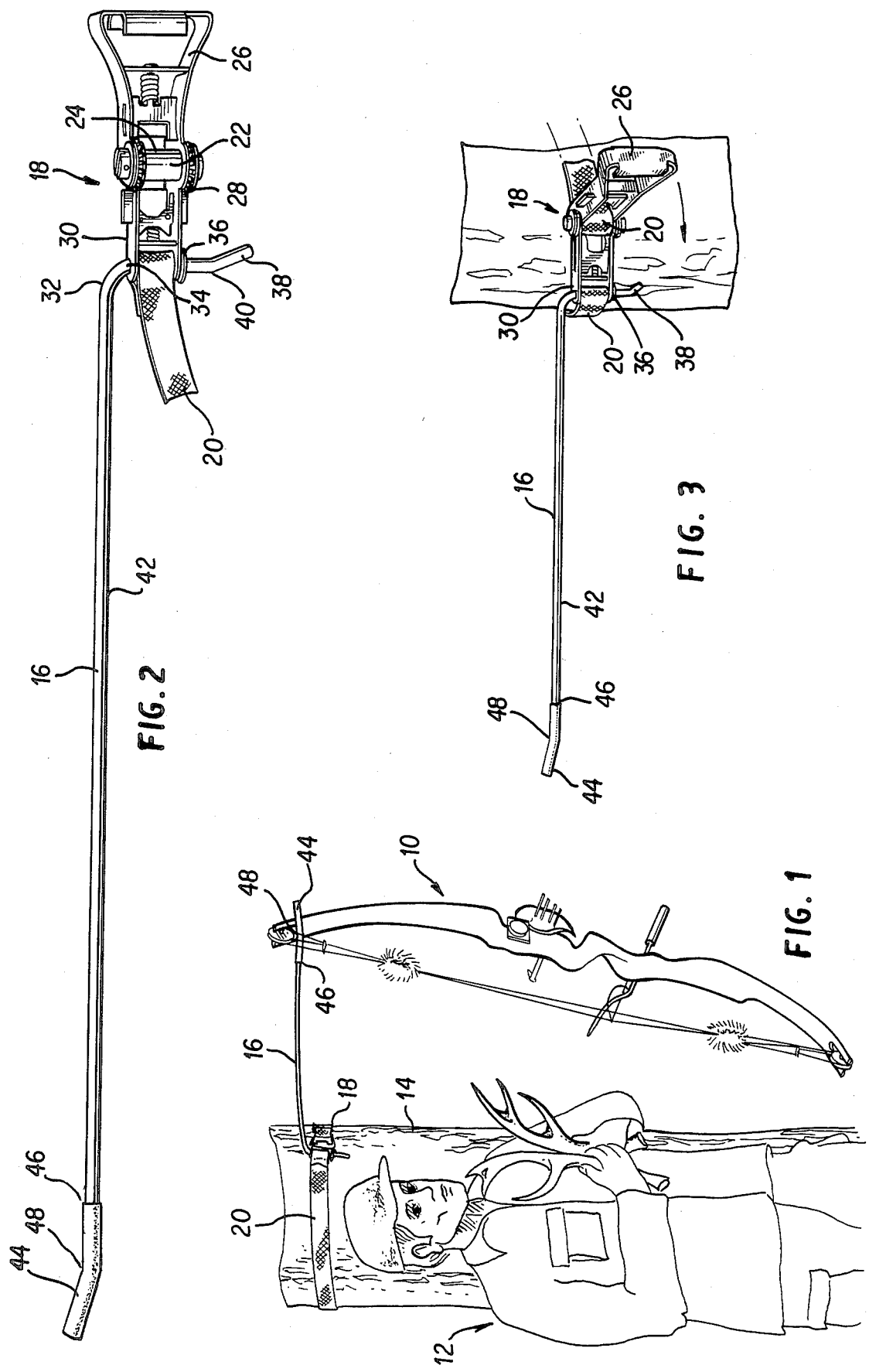

BOW HANGER

BACKGROUND OF THE INVENTION

This invention relates generally to devices for supporting a bow and more particularly to a device for supporting a sportsman's or hunter's bow while the hunter is positioned on a hunting stand with the bow being positioned nearby so as to be ready for immediate use when the demand arises.

A bow hunter who awaits the approach of game on a hunting stand can spend long hours in idleness. At such times there is no need for the hunter to be clutching his bow. Also it is often necessary for him to have his hands free in order to make sounds that lure the game into the vicinity of the hunter. Since the hunter requires the bow to be readily accessible for immediate use, he may use a peg or nail secured to a tree or a broken branch of a tree on which to hang the bow when not in use. When game comes into sight, he then removes the bow and goes into action. One known device for supporting a bow while the hunter is positioned on a hunting stand is disclosed in U.S. Pat. No. 4,542,873, entitled, "Bow Holder", issued to J. F. Matherly, et al. on Sept. 24, 1985.

It is an object of the present invention, therefore, to provide an improvement in bow hangers.

It is another object of the invention to provide a bow hanger for a hunter positioned on a hunting stand.

Still another object of the invention is to provide a relatively simple yet effective bow hanger which permits the bow to be quickly and easily removed for use.

A further object of the present invention is to provide a bow hanger that can be readily installed on and removed from a tree or the like.

SUMMARY

The foregoing and other objects achieved by means of a bow hanger are comprised of an elongated steel rod of relatively small diameter which is bent substantially at right angles at one end to form a downwardly directed portion which fits into a clevis included in a ratchet type of strap tightening device coupled to a nylon strap which is adapted to encircle and be tightened around a tree or other vertical standard. The other or far end of the rod includes an upwardly angulated tip covered by a piece of resilient tubing upon which the bow rests. The downwardly directed end portion of the rod also includes an offset end section which contacts the tree to maintain the main body portion of the rod in a generally horizontal position. The apparatus can be readily installed at a selected elevation so that a bow can be hung thereon until its use is needed. Subsequently, the assembly can be easily and quickly dismantled for use at another time and/or place.

BRIEF DESCRIPTION OF THE DRAWING

While the present invention is defined in the claims annexed to and forming a part of the specification, a better understanding can be had by reference to the following description taken in conjunction with the accompanying drawings in which:

FIG. 1 is a perspective view of the preferred embodiment of the invention installed for use by a bow hunter;

FIG. 2 is a partial front elevational view of he preferred embodiment of the invention shown in FIG. 1; and FIG. 3 is a partial perspective view of the invention illustrative of the manner in which it is installed on the tree shown in FIG. 1.

DETAILED DESCRIPTION OF THE PREFERRED EMBODIMENT

Referring now to the drawings and more particularly to FIG. 1, reference numeral 10 denotes a conventional compound bow and its accessories used by hunters and sportsmen. Such a bow is well known and is particularly well suited for hunting. A bow hunter not only hunts game on foot, but also stations himself for long periods of time on a hunting stand which is secured in some fashion to a tree, for example. FIG. 1 is intended to show a hunter 12 situated on a hunting stand, not shown, secured to a tree 14. During long periods of waiting for game, the hunter becomes tired of holding the bow 10 and accordingly wound like to have some type of bow hanger on which to hang the bow within arm's reach while yet being able to retrieve it with little effort and put it into use. Also he needs his hands free from time to time in order to generate sounds which will lure a predetermined type of game into range. For example, during deer season it is quite common for a bow hunter to rattle a pair of antlers together to simulate two bucks fighting over a doe during the rutting season so as to attract other bucks. Such is the case with respect to the subject invention as depicted in FIG. 1.

The invention comprises a relatively small diameter steel rod 16 which is attached at one end to a ratchet type of strap tightening device 18 for a strap 20 which is adapted to encircle a tree or other vertical standard containing a hunting stand as shown in FIG. 1. The strap tightening device 18 is typically of the type shown and described in U.S. Pat. No. 4,185,360, entitled, "Ratchet Buckle For Tightening And Tensioning Strap", which issued to E. Prete, Jr., et al. on Jan. 29, 1980.

As further shown in FIG. 2, the strap tightening device 18 includes a manually actuated spool or reel 22 having a lengthwise slot 24 which is adapted to receive the free end, not shown, of the strap 20. A handle 26 is further included which is operable to actuate a ratchet mechanism 28 coupled to the reel 22. By reciprocating the handle 26 backwards and forwards, the strap 20 will be caused to wind up on the spool or reel 22 and be tightened around the tree 14 as shown in FIG. 3.

The strap tightening device 18 additionally includes a clevis 30 to which one end of the strap 20 is attached and which also receives one end, i.e. the near end, of the rod 16. This end of the rod 16 includes a 90° bend 32 followed by a relatively short downwardly projecting end section 34 which passes through a bore in the clevis 30 where it is held in place by a push nut type of fastener 36 which is fitted over the end of the rod. The inner end of the rod 16 additionally includes a small angular (5°–150°) vertical offset section 38 beginning at 40 (FIG. 2). The end section 38 acts to force the main portion 42 of the rod 16 into a generally horizontal position when it comes into contact with the trunk of the tree 14.

The main portion 42 of the rod 16 comprises an elongated intermediate section which extends outwardly for a length of, for example, 24 in. where it terminates in an outer end section 44 which is angulated upwardly at an acute outside angle (approximately 25°) relative to the length dimension of the intermediate rod portion 42. It is this portion and the adjacent part of the rod portion 42 which operates to accommodate the bow 10 shown in FIG. 1.

In order to protect the bow 10 from the metal surface of the rod 16, there is included a piece of resilient tubing 46 which is fitted over the top or end portion 44 of the rod 16 and which extends along a short length of the intermediate rod section 42.

Referring now back to FIG. 1, it is shown that when the apparatus of the subject invention is assembled on the tree 14 at a predetermined level such as above the hunter's head, the rod portions 42 and 44 extend outwardly in front of the hunter. This permits the hunter 12 to hang the bow 10 on the part of the rod 16 covered by the tubing 46 where it will rest at the crook 48 in the rod until it is needed. The hunter 12 can thereafter quickly and easily lift the bow 10 from the rod 16. At the end of the day the hunter can, when desirable, dismantle the parts of the bow holder where they are then stored until they are again needed whereupon the parts are reassembled quickly and easily on any tree which can accommodate the length of the strap 20.

Having thus shown and described what is at present considered to be the preferred embodiment of the invention, it should be known that the same has been made by way of illustration and not limitation and accordingly, all modifications, alterations and changes comining within the spirit and scope of the invention are herein meant to be included.

I claim:

1. An archery bow hanger which may be readily installed and quickly removed from a support member, such as a tree, comprising:

a mounting strap for encircling said support member;

a ratchet type tensioning device for tightening said strap around said support member, said tensioning device further comprising means including a clevis for the attachment of one end of said mounting strap thereto, a strap wind-up reel for receiving the other end of said mounting strap, a ratchet mechanism coupled to the reel, and actuator means coupled to the ratchet mechanism for turning the reel; and an elongated bow support rod of relatively small cross section attached to the tensioning device at said clevis, said rod having a relatively long intermediate section, a relatively short upwardly angulated outer end section for receiving the bow, and a rear end section including a downwardly extending end portion inserted through and engaging said clevis and a relatively short rearwardly angulated tip portion for bracing the rod in a generally horizontal position against said support member.

2. The bow hanger as defined by claim 1 and additionally including means attached to said rear end section for holding said rod in place on said tensioning device.

3. The bow hanger as defined by claim 2 wherein said means attached to said rear end section comprises a fastener in slidable engagement with said downwardly extending end portion of said rod adjacent said clevis.

4. The bow hanger as defined by claim 1 and additionally including a resilient tubular member on said outer end section.

5. The bow hanger as defined by claim 4 wherein said tubular member extends inwardly of the outer end section a predetermined distance on said intermediate section.

6. The apparatus as defined by claim 1 wherein said outer end section is angulated upwardly at an acute outside angle relative to the length dimension of said intermediate section.

7. The apparatus as defined by claim 6 wherein said acute angle is approximately 25°.

8. The apparatus as defined by claim 1 wherein said downwardly extending end portion of said rear end section is substantially at a right angle relative to the length dimension of said intermediate section.

* * * * *